United States Patent [19]
Fitzgerald et al.

[11] 3,898,073
[45] Aug. 5, 1975

[54] METHOD FOR ALTERING PLANT FLOWERING AND SEXUAL REPRODUCTION

[75] Inventors: David Joseph Fitzgerald, Wilmington, Del.; James Delbert Long, Elkton, Md.

[73] Assignee: E. I. du Pont de Nemours & Co., Wilmington, Del.

[22] Filed: Oct. 30, 1972

[21] Appl. No.: 301,852

[52] U.S. Cl. ................................ 71/93; 47/1.41
[51] Int. Cl. ............................... A01n 9/22
[58] Field of Search ................ 71/93; 47/1.41

[56] References Cited
UNITED STATES PATENTS

| | | | |
|---|---|---|---|
| 2,321,989 | 6/1943 | Burke | 260/243 |
| 3,040,044 | 6/1962 | Hinsch et al. | 71/93 |
| 3,462,257 | 8/1969 | McVey et al. | 71/93 |

*Primary Examiner*—James O. Thomas, Jr.

[57] ABSTRACT

A method for altering plant flowering and/or plant sexual reproduction involving application of an s-triazinedione such as 3-(4-chlorophenyl)-6-methylthio-s-triazine-2,4(1H,3H)-dione or 3-(4-chlorophenyl)-6-methoxy-s-triazine-2,4(1H,3H)-dione. A preferred use of the invention is to prevent corn inbreeding by applying the s-triazinedione to the plant shortly before or at tassel emergence.

31 Claims, No Drawings

METHOD FOR ALTERING PLANT FLOWERING AND SEXUAL REPRODUCTION

BACKGROUND OF THE INVENTION

It is known that certain s-triazines are herbicides. Neumayer et al., "Pesticides", Chemical Week, Apr. 12 and 26, 1969, lists several commercial and experimental s-triazine herbicides. Among these are prometone and prometryne, which have the structural formulae:

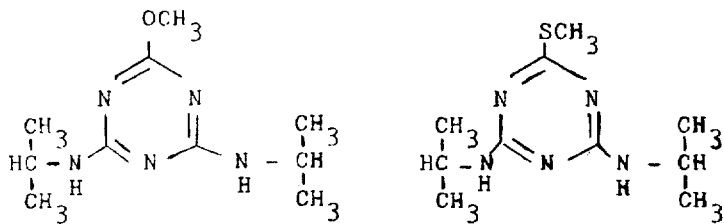

prometone     prometryne

These and related compounds are disclosed in U.S. Pat. No. 2,909,420.

The s-triazines of this invention are also herbicides. The compounds and their use as herbicides are disclosed and claimed in application of Fuchs and Lin, U.S. Ser. No. 181,202, filed Sept. 16, 1971, now abandoned.

It has now been discovered that the compounds also are useful as plant regulants in that they alter plant flowering and/or plant sexual reproduction.

SUMMARY OF THE INVENTION

This invention is a method of altering plant flowering and/or plant sexual reproduction which comprises applying an s-triazinedione to the plant in an amount which is effective to alter flowering and/or sexual reproduction of the plant without causing substantial foliar burn, chlorosis or necrosis, the s-triazine dione being a compound of the formula:

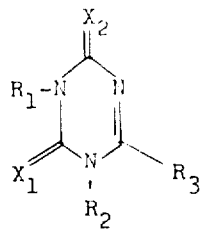

I wherein
$R_1$ is a straight chain alkyl of 1 through 3 carbon atoms, a branched chain alkyl of 3 through 8 carbon atoms, cycloalkyl of 3 through 8 carbon atoms, cycloalkylalkyl of 4 through 7 carbon atoms, alkenyl of 3 through 4 carbon atoms, alkynyl of 3 through 4 carbon atoms, benzyl or

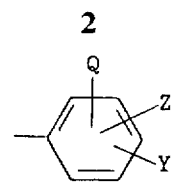

wherein
Y is hydrogen, halogen, alkyl of 1 through 4 carbon atoms, nitro, alkoxy of 1 through 4 carbon atoms, alkylthio of 1 through 4 carbon atoms, cyano or trifluoromethyl;

Z is hydrogen, halogen, methyl, ethyl, nitro, methoxy, or methylthio; and
Q is hydrogen, halogen or methyl;
$R_2$ is hydrogen, or a group

where A is alkyl of 1 through 3 carbon atoms or alkoxy or alkylthio of 1 through 4 carbon atoms, or a cation selected from lithium, sodium, potassium, calcium, magnesium, barium, or

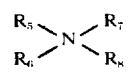

where
$R_5$, $R_6$ and $R_7$ can be the same or different and each can be hydrogen, alkyl of 1 through 4 carbon atoms, or hydroxy alkyl of 2 through 4 carbon atoms; and $R_8$ is hydrogen, alkyl of 1 through 12 carbon atoms, or benzyl; $R_5$ and $R_6$ can be taken together to form a ring that is —(CH$_2$)$_2$—O—(CH$_2$)$_2$— or —(CH$_2$)$_n$— where $n$ is 4–6 and $R_7$ and $R_8$ are H;
$R_3$ is SR$_4$ or OR$_4$ where, when $R_1$ is phenyl or substituted phenyl, $R_4$ is methyl or ethyl, and when $R_1$ is other than phenyl or substituted phenyl, $R_4$ is alkyl of 1 through 6 carbon atoms, cycloalkyl of 3 through 6 carbon atoms, alkenyl of 3 through 4 carbon atoms, alkynyl of 3 through 4 carbon atoms, or benzyl, and
$X_1$ and $X_2$ are oxygen or sulfur.

Preferred because of high activity and relatively low phytotoxicity are those compounds of Formula I where $R_1$ is phenyl or substituted phenyl as given above.

More preferred because of higher activity are those compounds of the preferred scope where Y is hydrogen, halogen or methyl,
Z is halogen, and
Q is hydrogen.

Most preferred because of highest activity are 1. 3-(4-chlorophenyl)-6-methylthio-s-triazine-2,4(1H,3H)-dione
2. 3-(4-chlorophenyl)-6-methoxy-s-triazine-2,4(1H,3H)-dione
3. 3-(4-bromophenyl)-6-methoxy-s-triazine-2,4(1H,3H)-dione
4. 3-(3,4-difluorophenyl)-6-methoxy-s-triazine-2,4(1H,3H)-dione
5. 3-(4-methylphenyl)-6-methoxy-s-triazine-2,4(1H,3H)-dione
6. 3-(2-chlorophenyl)-6-methoxy-s-triazine-2,4(1H,3H)-dione
7. 3-(4-fluorophenyl)-6-methoxy-s-triazine-2,4(1H,3H)-dione
8. 3-(2,4-dichlorophenyl)-6-methoxy-s-triazine-2,4(1H,3H)-dione
9. 3-(2-methylphenyl)-6-methoxy-s-triazine-2,4(1H,3H)-dione.

A preferred embodiment of this invention is a method of preventing imbreeding of corn which comprises applying an s-triazinedione of Formula I to the corn before or at tassel emergence in an amount sufficient to prevent self-fertilization but insufficient to cause substantial foliar burn, chlorosis or necrosis.

DESCRIPTION OF THE INVENTION

The compounds of Formula I can be made by the process illustrated by the following equations:

from thiopseudourea (Equation 1) can be performed analogous to a procedure given in Organic Synthesis 42, 87, which describes the preparation of methyl 4-phenyl-3-thioallophanimidate (1-phenyl-2-thio-4-methylisobiuret).

The reaction products of Equation (1) are reacted at about 0°–45°C in a solvent, e.g. methylene chloride, with one equivalent of a chloroformate or a chlorothiolformate in the presence of one equivalent of a base such as triethylamine (Equations 2a and 2b). After completion of the reaction, the methylene chloride solution is washed with water, dried, and the solvent evaporated to give alkoxycarbonylallophanimidates, alkylthiolcarbonylallophanimidates, alkoxycarbonylthioallophanimidates, alkylthiolcarbonylthioallophanimidates, alkoxycarbonyldithioallophanimidates and alkylthiolcarbonyldithioallophanimidates. Using a chlorodithioformate in the above reaction affords the corresponding alkylthiolthiocarbonylallophanimidates, alkylthiolthiocarbonylthioallophanimidates and alkylthiolthiocarbonyldithioallophanimidates.

The reaction products of Equation (2a) and Equation (2b) are than refluxed for a sufficient time with a base such as sodium methoxide in methanol to effect cyclization (Equations 3a and 3b). The solvent is then evaporated under vacuum and the residue dissolved in water. Acidification of the aqueous solution usually precipitates the desired s-triazinediones, thio-s-triazinediones or s-triazinedithiones as an substantially pure solid.

The reaction products of Equations (2a) and (2b) are also obtained by reacting the pseudourea or thiopseudourea first with a chloroformate, a chlorothiolfor-

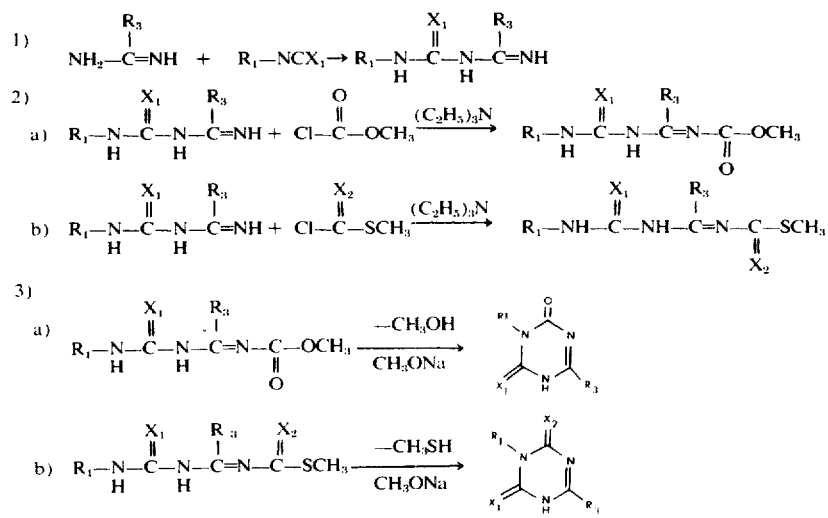

wherein $R_1$, $R_3$, $X_1$ and $X_2$ are as previously defined.

The synthesis of allophanimidates and 3-thioallophanimidates from pseudourea and the synthesis of 1-thioallophanimidates and 1,3-dithioallophanimidates mate or a chlorodithioformate as in Equations (4a) and (4b), and then reacting the reaction products of Equations (4a) and (4b) with an isocyanate or isothiocyanate as in Equations (5a) and (5b).

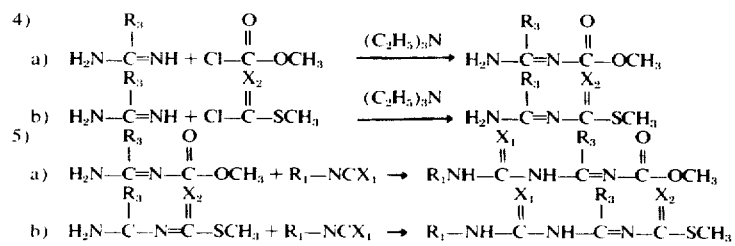

wherein $R_1$, $R_3$, $X_1$ and $X_2$ are as previously defined.

Reacting the intermediate allophanimidates of equation (1) with phosgene or thiophosgene at temperatures of 0 to 100°C also gives the s-triazinediones of this invention:

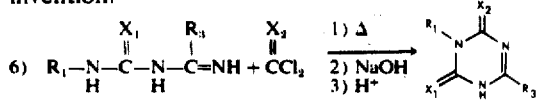

The s-triazinediones form salts which are useful alone or can be reacted with an acyl chloride, and alkylchloroformate, or an alkyl chlorothiolformate to give 1-substituted analogs as illustrated by the following equations:

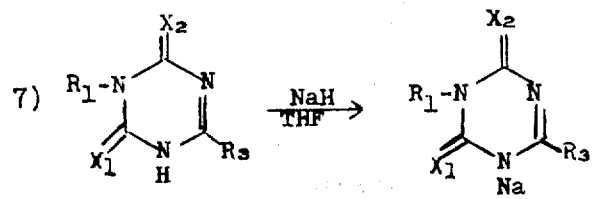

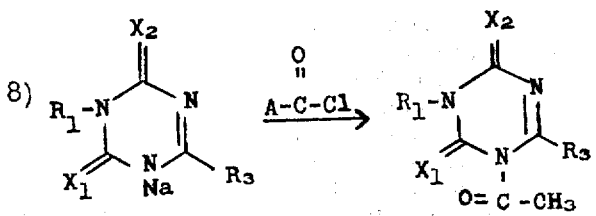

wherein A is an alkyl, alkylthio, or alkoxy group.

The following examples are offered to illustrate the processes described above. All parts are parts by weight unless otherwise indicated.

EXAMPLE 1

3-tert-Butyl-6-methylthio-s-triazine-2,4(1H,3H)-dione

To a solution of 139 parts of 2-methyl-2-thiopseudourea sulfate in 1000 parts of 50% aqueous methanol at 0°C is added dropwise 88 parts of 50% sodium hydroxide, followed by 90 parts tert-butyl isocyanate in 200 parts tetrahydrofuran. The solution is concentrated at reduced pressure and filtered to yield, after drying, 90 parts of methyl 4-tert-butyl-1-thioallophanimidate melting at 102°–104°C.

To a solution of 5.67 parts of the above compound and 4 parts of triethylamine in 50 parts methylene chloride at 0°C is added dropwise 3.3 parts methyl chlorothiolformate in 5 parts of methylene chloride. The solution is stirred overnight and washed once with water. After drying and evaporation of the solvent, there is obtained 3.8 parts methyl 4-tert-butyl-N-methylthiolcarbonyl-1-thioallophanimidate melting at 102°–105°C.

A solution of five parts of the above compound in 50 parts of methanol containing 3 parts of sodium methoxide is refluxed for one hour. The reaction mixture is then cooled and the methanol is evaporated at reduced pressure. One hundred parts of water are added and the solution twice extracted with 50 parts of ether. The aqueous layer is then neutralized at 0° to 5°C with hydrochloric acid and extracted with methylene chloride. The methylene chloride extract is dried and the solvent evaporated to give 3 parts of 3-tert-butyl-6-methylthio-s-triazine-2,4(1H,3H)-dione, melting at 112°–115°C.

EXAMPLE 2

3-Isopropyl-6-methylthio-s-triazine-2,4(1H,3H)-dione

To a solution of 69.5 parts of 2-methyl-2-thiopseudourea sulfate and 47 parts of methyl chloroformate in 1000 parts of water at 0°C is added dropwise 56.9 parts of potassium hydroxide in 200 parts of water. The reaction mixture is stirred at room temperature for 3 hours and then extracted with methylene chloride. The methylene chloride extract is dried and the solvent evaporated at reduced pressure to give 45 g of methyl N-(1-amino-1-methylthiomethylene)carbamate melting at 72°–77°C.

A solution of seventy-four parts of the above compound and 47 parts of isopropyl isocyanate in 300 parts methylene chloride is stirred overnight. The solvent is evaporated to give 113.6 parts of methyl 4-isopropyl-N-methoxycarbonyl-1-thioallophanimidate melting at 129°–132°C.

A solution of one hundred parts of the above compound in 200 parts of methanol containing 27 parts of sodium methoxide is refluxed for 1 hour. The methanol is evaporated under vacuum and the residue dissolved in 200 parts of water. The aqueous solution is neutralized with hydrochloric acid to afford after filtration and drying 55 parts of 3-isopropyl-6-methylthio-s-triazine-2,4(1H,3H)-dione melting at 188°–190°C.

EXAMPLE 3

3-Methyl-6-methylthio-s-triazine-2,4(1H,3H)-dione

To a solution of 69.5 parts of 2-methyl-2-thiopseudourea sulfate and 110 parts of methyl chlorothiolformate in 500 ml of water is added dropwise at 0°–5°C 120 parts of 50% sodium hydroxide. The reaction mixture is stirred at 0°–5°C for 1 hour and then at room temperature for 2 hours. The solution is then extracted with methylene chloride and the organic extract dried and evaporated under vacuum to give 47 parts of methyl N-(1-amino-1-methylthiomethylene)-thiolcarbamate melting at 75°–76°C.

To a solution of 8.2 parts of the above compound in 75 parts of methylene chloride is added 3.1 parts of methyl isocyanate. The reaction mixture is stirred at room temperature for 3 hours, and then the solvent evaporated under vacuum to give 10 parts of methyl 4-methyl-N-methylthiolcarbonyl-1-thiolallophanimidate melting at 115°–117°C.

A solution of six parts of the above compound in 75 parts of methanol containing 4.5 parts sodium methoxide is refluxed for 1 hour. The methanol is evaporated and the residue dissolved in water. The aqueous solution is then neutralized with hydrochloric acid at 0°–5°C. The precipitate is collected by filtration and dried to give 2.3 parts of 3-methyl-6-methylthio-s-triazine-2,4(1H,3H)-dione melting at 243°–244°C.

EXAMPLE 4

3-(p-Chlorophenyl)-6-methylthio-s-triazine-2,4-(1H,3H)-dione

To a solution of 148 parts of methyl N-(1-amino-1-methylthiomethylene)-carbamate, prepared as in Example 2, in 2,000 parts methylene chloride is added 154 parts of p-chlorophenyl isocyanate. The reaction is stirred for 3 days. Then to it is added 54 parts of sodium methoxide in 540 parts of methanol. The reaction mixture is then refluxed for 1 hour. The reaction mass is cooled, and 2,000 parts of ether are added. The solid collected by filtration is dissolved in water and the solution neutralized with hydrochloric acid. The new solid thus formed is collected, dried, and recrystallized from ethanol/$H_2O$ to give 140 parts of 3-(p-chlorophenyl)-6-methylthio-s-triazine-2,4(1H,3H)-dione melting at 292°–295°C.

EXAMPLE 5

3-sec-Butyl-6-methylthio-s-triazine-2,4(1H,3H)-dione

To a solution of 7.2 parts of methyl N-(1-amino-1-methylthiomethylene)carbamate, prepared as in Example 2, in 50 parts of methylene chloride is added 5.5 parts of sec-butyl isocyanate. The reaction mixture is stirred overnight and the solvent evaporated to give 12 parts of crude methyl 4-sec-butyl-N-methoxycarbonyl-1-thioallophanimidate melting at 102°–104°C.

The above product is refluxed for 1 hour in 150 parts of methanol containing 6 parts of sodium methoxide. The solvent is evaporated under vacuum and the residue is dissolved in 100 parts of water. The aqueous solution is extracted with methylene chloride and the aqueous layer than neutralized at 0°–5°C with hydrochloric acid. The aqueous solution is extracted again with methylene chloride. The extract is dried and the methylene chloride evaporated to give 7 parts of a solid melting at 124°–132°C. Recrystallization from chlorobutane gives 4 parts of 3-sec-butyl-6-methylthio-s-triazine-2,4(1H,3H)-dione, melting at 133.5°–135.5°C.

EXAMPLE 6

3-(p-Chlorophenyl)-6-methoxy-s-triazine-2,4(1H,3H)-dione

To 52 parts of 2-methylpseudourea hydrogen sulfate in 250 parts of water at 0°–5°C is added 31 parts of methyl chloroformate followed by dropwise addition of 74 parts of 50% sodium hydroxide. The reaction mass is stirred at room temperature for 3 hours and then extracted with methylene chloride. The methylene chloride extract is dried and the solvent evaporated. The residue is triturated with hexane to give 23 parts of methyl N-(1-amino-1-methoxy-methylene)-carbamate melting at 36°–39.5°C.

To 13 parts of the compound prepared above in 200 ml of methylene chloride is added 15 parts of p-chlorophenyl isocyanate. The reaction mass is stirred overnight. The solvent is evaporated and the residue refluxed overnight in 100 parts of 10% sodium methoxide in methanol. Water is added and the solution neutralized with hydrochloric acid. The crude solid collected by filtration is recrystallized from acetonitrile to give 7 parts of 3-(p-chlorophenyl)-6-methoxy-s-triazine-2,4(1H,3H)-dione melting at 238°–241°C.

EXAMPLE 7

3-(2-Methyl-4-chlorophenyl)-6-methoxy-s-triazine-2,4(1H,3H)-dione

To 20 parts of methyl N-(1-amino-1-methoxymethylene)carbonate prepared as in Example 6 in 200 parts of methylene chloride is added 25 parts of 2-methyl-4-chlorophenyl isocyanate. It is stirred overnight and 8 parts of sodium methoxide in 80 parts of methanol is added. It is refluxed for 1 hour and the solid is collected by filtration. It is dissolved in water and the solution neutralized at 0°–5°C. with concentrated hydrochloric acid. The precipitate is collected by filtration to give 25 parts of 3-(2-methyl-4-chlorophenyl)-6-methoxy-s-triazine-2,4(1H,3H)-dione melting at 193°–195°C.

EXAMPLE 8

3-(o-Fluorophenyl)-6-methylthio-s-triazine-2,4(1H,3H)-dione

To a solution of 16 parts of methyl N-(1-amino-1-methylthiomethylene)carbamate, prepared as in Example 2, in 150 parts of methylene chloride is added 15 parts of o-fluorophenyl isocyanate. The reaction mixture is stirred overnight and the solvent evaporated to give after trituration with hexane 29 parts of methyl 4-(o-fluorophenyl)-N-methoxycarbonyl-1-thioallophanimidate melting at 123°–125°C.

Sixteen parts of the above product are refluxed for 1 hour in 150 parts of methanol containing 9 parts of sodium methoxide. The solvent is evaporated under vacuum and the residue is dissolved in 200 parts of water. The aqueous solution is extracted with methylene chloride and the aqueous layer then neutralized at 0°–5°C. with hydrochloric acid. The precipitate is collected and dried to give 11 parts of 3-(o-fluorophenyl)-6-methylthio-s-triazine-2,4(1H,3H)-dione melting at 196°–199°C.

EXAMPLE 9

The following s-triazinediones can be prepared by the procedure of Example 2 by substituting the listed 2-substituted thiopseudoureas and pseudoureas, for 2-methyl-2-thiopseudourea, by using various chloroformates and by replacing isopropyl isocyanate with various isocyanates or isothiocyanates.

| Thiopseudourea or Pseudourea | Isocyanate or Isothiocyanate | Formates | s-Triazinediones |
|---|---|---|---|
| 2-methyl-2-thiopseudourea | ethyl isocyanate | methyl chloroformate | 3-ethyl-6-methylthio-s-triazine-2,4-(1H,3H)-dione, m.p. 190–191° |
| " | phenyl isocyanate | " | 3-phenyl-6-methylthio-s-triazine-2,4-(1H,3H)-dione, m.p. 235–245° |
| " | cyclohexyl isocyanate | " | 3-cyclohexyl-6-methylthio-s-triazine-2,4(1H,3H)-dione, m.p. 255–257° |
| " | o-fluorophenyl isocyanate | " | 3-(o-fluorophenyl)-6-methylthio-s-triazine-2,4(1H,3H)-dione, m.p. 196–199° |
| " | o-nitrophenyl isocyanate | " | 3-(o-nitrophenyl)-6-methylthio-s-triazine-2,4(1H,3H)-dione, m.p. 196–202° |
| " | propyl isocyanate | " | 3-propyl-6-methylthio-s-triazine-2,4-(1H,3H)-dione, m.p. 145–148° |
| " | m-tolyl isocyanate | " | 3-(m-tolyl)-6-methylthio-s-triazine-2,4-(1H,3H)-dione, m.p. 176–180° |
| " | allyl isocyanate | " | 3-allyl-6-methylthio-s-triazine-2,4(1H,3H)-dione, m.p. 140–142° |

-Continued

| Thiopseudourea or Pseudourea | Isocyanate or Isothiocyanate | Formates | s-Triazinediones |
|---|---|---|---|
| " | 3,4-dichlorophenyl isocyanate | " | 3-(3,4-dichlorophenyl)-6-methylthio-s-triazine-2,4(1H,3H)-dione, m.p. 269–271° |
| " | p-fluorophenyl isocyanate | " | 3-(p-fluorophenyl)-6-methylthio-s-triazine-2,4(1H,3H)-dione, m.p. 239–243° |
| " | p-nitrophenyl isocyanate | " | 3-(p-nitrophenyl)-6-methylthio-s-triazine-2,4(1H,3H)-dione, m.p. 279–280.5° |
| " | p-bromophenyl isocyanate | " | 3-(p-bromophenyl)-6-methylthio-s-triazine-2,4(1H,3H)-dione, m.p. 272–273° |
| " | o-chlorophenyl isocyanate | " | 3-(o-chlorophenyl)-6-methylthio-s-triazine-2,4(1H,3H)-dione, m.p. 212.5–214° |
| " | m-chlorophenyl isocyanate | " | 3-(m-chlorophenyl)-6-methylthio-s-triazine-2,4(1H,3H)-dione, m.p. 192–195.5° |
| " | cyclohexylmethyl isocyanate | " | 3-cyclohexylmethyl-6-methylthio-s-triazine-2,4(1H,3H)-dione, m.p. 177.5–178° |
| 2-allyl-2-thiopseudourea | isopropyl isocyanate | " | 3-isopropyl-6-allylthio-s-triazine-2,4-(1H,3H)-dione, m.p. 140–142° |
| 2-methylpseudourea | phenyl isocyanate | " | (3-phenyl-6-methoxy-s-triazine-2,4(1H,3H)-dione, m.p. 198–200° |
| " | cyclohexyl isocyanate | " | 3-cyclohexyl-6-methoxy-s-triazine-2,4-(1H,3H)-dione, m.p. 212–220° |
| " | p-fluorophenyl isocyanate | " | 3-(p-fluorophenyl)-6-methoxy-s-triazine-2,4(1H,3H)-dione, m.p. 234–237° |
| " | m-chlorophenyl isocyanate | " | (3-(m-chlorophenyl)-6-methoxy-s-triazine-2,4(1H,3H)-dione, m.p. 183–185.5° |
| " | m-fluorophenyl isocyanate | " | 3-(m-fluorophenyl)-6-methoxy-s-triazine-2,4(1H,3H)-dione, m.p. 184–186° |
| " | sec-butyl isocyanate | " | 3-sec-butyl-6-methoxy-s-triazine-2,4(1H,3H)-dione, m.p. 121–122.5° |
| 2-ethylpseudourea | p-chlorophenyl isocyanate | " | 3-(p-chlorophenyl)-6-ethoxy-s-triazine-2,4-(1H,3H)-dione, m.p. 241–242° |
| 2-methylpseudourea | p-nitrophenyl isocyanate | " | 3-(p-nitrophenyl)-6-methoxy-s-triazine-2,4-(1H,3H)-dione, m.p. 290–292° |
| " | p-bromophenyl isocyanate | " | 3-(p-bromophenyl)-6-methoxy-s-triazine-2,4-(1H,3H)-dione, m.p. 208–210° |
| " | 3,4-dichlorophenyl isocyanate | " | 3-(3,4-dichlorophenyl)-6-methoxy-s-triazine-2,4(1H,3H)-dione, m.p. 197–199° |
| 2-methyl-2-thiopseudourea | phenyl isothiocyanate | " | 3-phenyl-6-methylthio-2-thio-s-triazine-2,4(1H,3H)-dione, m.p. 235–238° |
| 2-methylpseudourea | p-methoxyphenyl isocyanate | " | 3-(p-methoxyphenyl)-6-methoxy-s-triazine-2,4(1H,3H)-dione, m.p. 213–214° |
| " | p-tolyl isocyanate | " | 3-(p-tolyl)-6-methoxy-s-triazine-2,4(1H,3H)-dione, m.p. 225–226° |
| " | benzyl isocyanate | " | 3-benzyl-6-methoxy-s-triazine-2,4(1H,3H)-dione, m.p. 169–170° |
| 2-hexyl-2-thiopseudourea | propyl isocyanate | " | 3-propyl-6-hexylthio-s-triazine-2,4-(1H,3H)-dione |
| 2-cyclopropyl-2-thiopseudourea | cyclopropyl isocyanate | " | 3-cyclopropyl-6-cyclopropylthio-s-triazine-2,4(1H,3H)-dione |
| 2-cyclohexyl-2-thiopseudourea | cyclooctyl isocyanate | " | 3-cyclooctyl-6-cyclohexylthio-s-triazine-2,4(1H,3H)-dione |
| 2-allyl-2-thiopseudourea | cyclopropylmethyl isocyanate | " | 3-cyclopropylmethyl-6-allylthio-s-triazine-2,4(1H,3H)-dione |
| 2-(3-methylallyl)-2-thiopseudourea | cyclohexylmethyl isocyanate | methyl chlorothiolformate | 3-cyclohexylmethyl-6-(3-methylallylthio)-s-triazine-2,4(1H,3H)-dione |
| 2-propargyl-2-thiopseudourea | allyl isocyanate | methyl chloroformate | 3-allyl-6-propargylthio-s-triazine-2,4(1H,3H)-dione |
| 2-(3-methylpropargyl)-2-thiopseudourea | 3-methylallyl isocyanate | | 3-(3-methylallyl)-6-(3-methylpropargylthio)-s-triazine-2,4(1H,3H)-dione |
| 2-benzyl-2-thiopseudourea | propargyl isocyanate | " | 3-propargyl-6-benzylthio-s-triazine-2,4(1H,3H)-dione |
| 2-methylpseudourea | 3-methylpropargyl isocyanate | " | 3-(3-methylpropargyl)-6-methoxy-s-triazine-2,4(1H,3H)-dione |
| 2-hexylpseudourea | benzyl isocyanate | " | 3-benzyl-6-hexyloxy-s-triazine-2,4-(1H,3H)-dione |
| 2-methyl-2-thiopseudourea | p-iodophenyl isocyanate | methyl chlorodithioformate | 3-(p-iodophenyl)-6-methylthio-2-thio-s-triazine-2,4(1H,3H)-dione |
| 2-ethyl-2-thiopseudourea | m-tolyl isocyanate | " | 3-(m-tolyl)-6-(ethylthio)-2-thio-s-triazine-2,4(1H,3H)-dione |
| " | p-butylphenyl isocyanate | " | 3-(p-butylphenyl)-6-ethylthio-2-thio-s-triazine-2,4(1H,3H)-dione |
| " | p-nitrophenyl isocyanate | " | 3-(p-nitrophenyl)-6-ethylthio-2-thio-s-triazine-2,4(1H,3H)-dione |
| " | o-methoxyphenyl isocyanate | methyl chlorothiolformate | 3-(o-methoxyphenyl)-6-ethylthio-s-triazine-2,4(1H,3H)-dione |
| " | m-butoxyphenyl isocyanate | " | 3-(m-butoxyphenyl)-6-ethylthio-s-triazine-2,4(1H,3H)-dione |
| 2-methyl-2-thiopseudourea | p-methylthiophenyl isocyanate | " | 3-(p-methylthiophenyl)-6-methylthio-s-triazine-2,4(1H,3H)-dione |
| " | m-butylthiophenyl isocyanate | " | 3-(m-butylthiophenyl)-6-methylthio-s-triazine-2,4(1H,3H)-dione |
| " | p-cyanophenyl isocyanate | " | 3-(p-cyanophenyl)-6-methylthio-s-triazine-2,4(1H,3H)-dione |
| " | m-trifluoromethylphenyl isocyanate | " | 3-(m-trifluoromethylphenyl)-6-methylthio-s-triazine-2,4(1H,3H)-dione |
| " | 3,5-dichlorophenyl isocyanate | methyl chloroformate | 3-(3,5-dichlorophenyl)-6-methylthio-s-triazine-2,4(1H,3H)-dione |
| " | p-bromo-m-chlorophenyl isocyanate | " | 3-(p-bromo-m-chlorophenyl)-6-methylthio-s-triazine-2,4(1H,3H)-dione |
| " | 2-chloro-4-methylphenyl isocyanate | " | 3-(2-chloro-4-methylphenyl)-6-methylthio-s-triazine-2,4(1H,3H)-dione |
| " | o-fluorophenyl isocyanate | " | 3-(o-fluorophenyl)-6-methylthio-s-triazine-2,4(1H,3H)-dione |
| " | 2-methyl-4-chlorophenyl isocyanate | " | 3-(2-methyl-4-chlorophenyl)-6-methylthio-s-triazine-2,4(1H,3H)-dione |
| " | 2-ethylhexyl isocyanate | " | 3-(2-ethylhexyl)-6-methylthio-s-triazine-2,4(1H,3H)-dione |

-Continued

| Thiopseudourea or Pseudourea | Isocyanate or Isothiocyanate | Formates | s-Triazinediones |
|---|---|---|---|
| 2-ethylpseudourea | 2-chloro-5-methoxyphenyl isocyanate | " | 3-(2-chloro-5-methoxyphenyl)-6-ethoxy-s-triazine-2,4(1H,3H)-dione |
| " | 3-methyl-4-bromophenyl isocyanate | " | 3-(3-methyl-4-bromophenyl)-6-ethoxy-s-triazine-2,4(1H,3H)-dione |
| " | 2-bromo-4-nitrophenyl isocyanate | " | 3-(2-bromo-4-nitrophenyl)-6-ethoxy-s-triazine-2,4(1H,3H)-dione |
| " | 2-nitro-4-chlorophenyl isocyanate | " | 3-(2-nitro-4-chlorophenyl)-6-ethoxy-s-triazine-2,4(1H,3H)-dione |
| " | 2,4-dichlorophenyl isocyanate | " | 3-(2,4-dichlorophenyl)-6-ethoxy-s-triazine-2,4(1H,3H)-dione |
| 2-methylpseudourea | 2,4-dibromophenyl isocyanate | " | 3-(2,4-dibromophenyl)-6-methoxy-s-triazine-2,4(1H,3H)-dione |
| " | 2,5-dichloro-4-nitrophenyl isocyanate | " | 3-(2,5-dichloro-4-nitrophenyl)-6-methoxy-s-triazine-2,4(1H,3H)-dione |
| " | 3,4-diethoxyphenyl isocyanate | " | 3-(3,4-diethoxyphenyl)-6-methoxy-s-triazine-2,4(1H,3H)-dione |
| " | 2,4-difluorophenyl isocyanate | " | 3-(2,4-difluorophenyl)-6-methoxy-s-triazine-2,4(1H,3H)-dione |
| " | 2,5-dimethoxyphenyl isocyanate | " | 3-(2,5-dimethoxyphenyl)-6-methoxy-s-triazine-2,4(1H,3H)-dione |
| " | 3,5-dinitrophenyl isocyanate | " | 3-(3,5-dinitrophenyl)-6-methoxy-s-triazine-2,4(1H,3H)-dione |
| " | 2-fluoro-4,6-dinitrophenyl isocyanate | " | 3-(2-fluoro-4,6-dinitrophenyl)-6-methoxy-s-triazine-2,4(1H,3H)-dione |
| " | 3-nitro-4-fluorophenyl isocyanate | " | 3-(3-nitro-4-fluorophenyl)-6-methoxy-s-triazine-2,4(1H,3H)-dione |
| " | 2-methyl-4-methoxyphenyl isocyanate | " | 3-(2-methyl-4-methoxyphenyl)-6-methoxy-s-triazine-2,4(1H,3H)-dione |
| " | 2-methoxy-4-nitrophenyl isocyanate | " | 3-(2-methoxy-4-nitrophenyl)-6-methoxy-s-triazine-2,4(1H,3H)-dione |
| " | 2,4,5-trichlorophenyl isocyanate | " | 3-(2,4,5-trichlorophenyl)-6-methoxy-s-triazine-2,4(1H,3H)-dione |
| " | 2,4,6-trimethylphenyl isocyanate | " | 3-(2,4,6-trimethylphenyl)-6-methoxy-s-triazine-2,4(1H,3H)-dione |

EXAMPLE 10

3-Isopropyl-6-methylthio-s-triazine-2,4(1H,3H)-dione

To a solution of 138 parts of 2-methyl-2-thiopseudourea sulfate in 500 parts of water is added 80 parts 50% sodium hydroxide at 0°–10°C. One thousand parts of acetone are added followed by a dropwise addition of 85 parts of isopropyl isocyanate at 0°C. The reaction mixture is allowed to warm to room temperature in 2 hours. The acetone is evaporated and the solid is filtered and dried to give 150 parts methyl 4-isopropyl-1-thioallophanimidate melting at 81°–85°C.

To a solution of 3.9 parts of phosgene in 100 parts of benzene is added dropwise 8.7 parts of the above compound in 50 parts of tetrahydrofuran. The reaction mixture is heated to reflux, cooled, and 16 parts of 50% sodium hydroxide in 100 parts of water added. After heating the solution to reflux, the benzene layer is discarded and the aqueous layer is neutralized with hydrochloric acid to give after filtration and drying 2 parts of 3-isopropyl-6-methylthio-s-triazine-2,4-(1H,3H)-dione melting at 188°–190°C.

EXAMPLE 11

Sodium 3-isopropyl-6-methylthio-s-triazine-2,4-(1H,3H)-dione

To a solution of 1.6 parts of sodium methoxide in 20 parts of methanol is added 6.6 parts of 3-isopropyl-6-methylthio-s-triazine-2,4(1H,3H)-dione. The solution is evaporated under vacuum and the white solid is triturated with methylene chloride and filtered to give 5.5 parts of sodium 3-isopropyl-6-methylthio-s-triazine-2,4(1H,3H)-dione melting above 300°C.

Similarly, the following s-triazinedione salts can be prepared by using the appropriate starting materials.

| | |
|---|---|
| Lithium | 3-isopropyl-6-methylthio-s-triazine-2,4-(1H,3H)-dione |
| Potassium | 3-isopropyl-6-methylthio-s-triazine-2,4-(1H,3H)-dione |
| Calcium | bis-3-(tert-butyl)-6-methylthio-s-triazine-2,4(1H,3H)-dione |
| Magnesium | bis-3-(tert-butyl)-6-methylthio-s-triazine-2,4(1H,3H)-dione |
| Barium | bis-3-(tert-butyl)-6-methylthio-s-triazine-2,4(1H,3H)-dione |
| Sodium | 3-(m-trifluoromethylphenyl)-6-methylthio-s-triazine-2,4(1H,3H)-dione |
| Sodium | 3-cyclooctyl-6-methylthio-s-triazine-2,4-(1H,3H)-dione, >300°C. |
| Sodium | 3-(m-fluorophenyl)-6-methylthio-s-triazine-2,4(1H,3H)-dione, >300°C. |
| Sodium | 3-(2-methyl-5-chlorophenyl)-6-methylthio-s-triazine-2,4(1H,3H)-dione, >300°C. |
| Sodium | 3-(3-chloro-4-methylphenyl)-6-methylthio-s-triazine-2,4(1H,3H)-dione, >300°C. |
| Sodium | 3-(2,6-dichlorophenyl)-6-methylthio-s-triazine-2,4(1H,3H)-dione, >300°C. |
| Sodium | 3-(p-tolyl)-6-methylthio-s-triazine-2,4-(1H,3H)-dione, >300°C. |
| Sodium | 3-cycloheptyl-6-methylthio-s-triazine-2,4-(1H,3H)-dione, >300°C. |

EXAMPLE 12

Ammonium 3-(p-chlorophenyl)-6-methoxy-s-triazine-2,4(1H,3H)-dione

To a mixture of 10 parts of 3-(p-chlorophenyl-6-methoxy-s-triazine-2,4(1H,3H)-dione and 100 parts of methanol is added 1 part of ammonia gas at 20°C. The solution is stirred for 30 minutes and then evaporated under vacuum to give 10.6 parts of ammonium 3-(p-chlorophenyl)-6-methoxy-s-triazine-2,4(1H,3H)-dione.

Similarly, the following s-triazinedione amine salts can be prepared by using the appropriate starting materials.

| | |
|---|---|
| methylammonium | 3-(p-chlorophenyl)-6-methoxy-s-triazine-2,4(1H,3H)-dione |
| tri-(2-hydroxyethyl)ammonium | " |
| " | 3-isopropyl-6-ethoxy-s-triazine-2,4-(1H,3H)-dione |
| dimethylammonium | " |
| ethylammonium | " |
| morpholinium | " |
| piperidinium | " |
| butylammonium | 3-(p-chlorophenyl)-6-methylthio-s-triazine-2,4(1H,3H)-dione |
| di-sec-butyl-ammonium | " |
| diethylammonium | " |
| propylammonium | " |
| hexahydroazepidinium | 3-isopropyl-6-methoxy-s-triazine-2,4(1H,3H)-dione |
| pyrrolidinium | " |
| tetraethylammonium | " |
| trimethylammonium | 3-(2-methyl-4-chlorophenyl)-6-methoxy-s-triazine-2,4(1H,3H)-dione |
| tetramethylammonium | " |
| dodecyltrimethylammonium | " |
| 2-hydroxyethylammonium | " |
| benzylammonium | " |
| benzyltrimethylammonium | " |
| triethylammonium | " |

EXAMPLE 13

1-Acetyl-3-isopropyl-6-methylthio-s-triazine-2,4(1H,3H)-dione

To 9.0 parts sodium 3-isopropyl-6-methylthio-s-triazine-2,4(1H,3H)-dione prepared as in Example 10 in 100 parts tetrahydrofuran can be added 3.1 parts acetyl chloride. The reaction can be refluxed for 5 hours and the solvent evaporated. Methylene chloride can be added to the residue and the solution can be washed with 1N sodium hydroxide and brine. After drying and evaporation of the solvent, the residue can be recrystallized from chlorobutane.

Similarly, the following s-triazinediones can be prepared by using appropriate starting materials.

| Starting s-triazinedione | Halide | Product |
|---|---|---|
| 3-isopropyl-6-methylthio-s-triazine-2,4(1H,3H)-dione | butyryl chloride | 1-butyryl-3-isopropyl-6-methylthio-s-triazine-2,4(1H,3H)-dione |
| 3-isopropyl-6-ethoxy-s-triazine-2,4(1H,3H)-dione | methyl chloroformate | 1-methoxycarbonyl-3-isopropyl-6-ethoxy-s-triazine-2,4(1H,3H)-dione |
| 3-(p-chlorophenyl)-6-methoxy-s-triazine-2,4(1H,3H)-dione | methyl chlorothiolformate | 1-methylthiolcarbonyl-3-(p-chlorophenyl)-6-methoxy-s-triazine-2,4(1H,3H)-dione |
| " | n-butyl chloroformate | 1-butylcarbonyl-3-(p-chlorophenyl)-6-methoxy-s-triazin-2,4(1H,3H)-dione |
| 3-(2-methyl-4-chlorophenyl)-6-methylthio-s-triazin-2,4(1H,3H)-dione | n-butyl chlorothiolformate | 1-butylthiolcarbonyl-3-(2-methyl-4-chlorophenyl)-6-methylthio-s-triazine-2,4(1H,3H)-dione |

EXAMPLE 14

3-Isopropyl-6-methoxy-s-triazine-2,4(1H,3H)-dione

A solution of 23 parts of methyl N-(1-amino-1-methoxymethylene)-carbamate, 16 part of isopropyl isocyanate 60 parts of methylene chloride, and a catalytic amount of dimethylformamide and triethylamine is allowed to stand at room temperature for 3 days. The solvent is evaporated to afford 33 parts of crude methyl 4-isopropyl-N-methoxycarbonylallophanimidate, an oil, $N_D^{25}$ 1.4823.

A solution of 9 parts of the above compound, 10 parts of sodium methoxide, and 100 parts of methanol is refluxed for 1 hr. The solvent is removed under vacuum. Water is then added to the residue. After extraction with methylene chloride, the aqueous layer is neutralized at 5°–10°C. Filtration affords 3 parts of crude solid, which is recrystallized from acetonitrile to give 2 parts of 3-isopropyl-4-methoxy-s-triazine-2,4(1H,3H)-dione, m.p. 195°–200°C.

EXAMPLE 15

3-Isopropyl-6-ethoxy-s-triazine-2,4-(1H,3H)-dione

To 114 parts of 2-methylpseudourea sulfate in 400 parts of water at 0°C is added 106 parts of 50% sodium hydroxide, followed by 400 parts of acetone, and 51 parts of isopropyl isocyanate. The reaction mixture is allowed to come to room temperature in 3 hrs. The organic solvent is then evaporated under vacuum, the aqueous residue saturated with sodium chloride, and the mixture extracted with methylene chloride. The organic extract is dried and the methylene chloride evaporated to yield 78 parts of methyl 4-isopropylallophanimidate, m.p. 64°–67°C.

To a solution of 32 parts of the above compound and 24 parts of triethylamine at 0°C is added 27 parts of ethyl chlorothiolformate. The reaction mixture is stirred at room temperature overnight. Water is added and the methylene chloride layer is separated and dried. The methylene chloride is then evaporated to yield 64 parts of crude methyl 4-isopropyl-N-ethylthiolcarbonylallophanimidate, an oil.

A solution of 64 parts of the above compound, 40 parts of sodium methoxide, and 500 parts of ethanol is refluxed for 1 hour. Ethanol is then removed under vacuum and water is added to the residue. After extraction with methylene chloride, the aqueous layer is neutralized at 5°–10°C. with concentrated hydrochloric acid to yield after filtration 8 parts of a solid, which is recrystallized from a mixture of carbontetrachloride/acetonitrile to give 2 parts of 3-isopropyl-6-ethoxy-s-triazine-2,4-(1H,3H)-dione, m.p. 170°–171°C. The methoxy group in the starting material is replaced by an ethoxy group during the reaction in the ethanol solvent.

Formulation of the Compounds

Formulations of the compounds of Formula 1 for use in this invention can be prepared in conventional ways. They include dusts, granules, pellets, solutions, suspensions, emulsions, wettable powders, emulsifiable concentrates and the like. Many of these may be applied directly. Sprayable formulations can be extended in suitable media and used at spray volumes of from a few pints to several hundred gallons per acre. High strength compositions are primarily used as intermediates for further formulation. The formulations, broadly, contain about 1 to 99% by weight of active ingredient(s) and at least one of (a) about 0.1 to 20% surfactant(s) and (b) about 5 to 99% solid or liquid diluent(s). More specifically, they will contain these ingredients in the following approximate proportions:

| | Percent by Weight | | |
|---|---|---|---|
| | Active Ingredient | Diluent(s) | Surfactant(s) |
| Wettable Powders | 20–90 | 0–74 | 1–10 |
| Oil Suspensions, Emulsions, Solutions (including Emulsifiable Concentrates) | 5–50 | 40–95 | 0–15 |
| Aqueous Suspensions | 10–50 | 40–84 | 1–20 |
| Dusts | 1–25 | 70–99 | 0–5 |
| Granules and Pellets | 1–95 | 5–99 | 0–15 |
| High Strength Compositions | 90–99 | 0–10 | 0–2 |

Lower or higher levels of active ingredient can, of course, be present depending on the intended use and the physical properties of the compound. Higher ratios of surfactant to active ingredient are sometimes desirable, and are achieved by incorporation into the formulation or by tank mixing. Lower concentrations of active ingredient can aid in accurate application at the very low ratio reached for this invention. Sprayable and dust formulations are preferred.

As indicated above, the compounds of the invention form salts which have enhanced solubility in water or organic solvents. They may be prepared, isolated and formulated as noted above, or salt formation may be an integral part of the formulation procedure.

Typical solid diluents are described in Watkins, et al., "Handbook of Insecticide Dust Diluents and Carriers", 2nd. Edn., Dorland Books, Caldwell, N.J. The more absorptive diluents are preferred for wettable powders and the denser ones for dusts. Typical liquid diluents and solvents are described in Marsden, "Solvents Guide", 2nd. Edn., Interscience, New York, 1950. Solubility under 0.1% is preferred for suspension concentrates; solution concentrates are preferably stable against phase separation at 0°C. "McCutcheon's Detergents and Emulsifiers Annual", Allured Publ. Corp., Ridgewood, N.J., as well as Sisely and Wood, "Encyclopedia of Surface Active Agents", Chemical Publ. Co., Inc., New York, 1964, list surfactants and recommended uses. All formulations can contain minor amounts of additives to reduce foam, caking, corrosion, microbiological growth, etc.

The methods of making such compositions are well known. Solutions are prepared by simply mixing the ingredients. Fine solid compositions are made by blending and, usually, grinding as in a hammer or fluid energy mill. Suspensions are prepared by wet milling (see, for example, Littler, U.S. Pat. No. 3,060,084). Granules and pellets may be made by spraying the active material upon preformed granular carriers or by agglomeration techniques. See J. E. Browning, "Agglomeration", *Chemical Engineering*, Dec. 4, 1967, pp. 147ff. and "Perry's Chemical Engineer's Handbook", 4th. Edn., McGraw-Hill, N.Y., 1963, pp. 8–59ff.

For further information regarding the art of formulation, see for example:

H. M. Loux, U.S. Pat. No. 3,235,361, Feb. 15, 1966, Col. 6, Line 16 through Col. 7, Line 19 and Examples 10 through 41.

R. W. Luckenbaugh, U.S. Pat. No. 3,309,192, Mar. 14, 1967, Col. 5 Line 43 through Col. 7 Line 62 and Ex. 8, 12, 15, 39, 41, 52, 53, 58, 132, 138–140, 162–164, 166, 167, 169–182.

H. Gysin and E. Knusli, U.S. Pat. No. 2,891,855, June 23, 1959, Col. 3 Line 66 through Col. 5 Line 17 and Examples 1–4.

G. C. Klingman, "Weed Control as a Science", John Wiley & Sons, Inc., New York, 1961 pp. 81–96.

J. D. Fryer and S. A. Evans, "Weed Control Handbook", 5th Edn. Blackwell Scientific Publications, Oxford, 1968, pp. 101–103.

EXAMPLE 16

| Wettable Powder | Percent |
|---|---|
| 3-(4-chlorophenyl)-6-methoxy-s-triazine-2,4(1H,3H)-dione | 40 |
| dioctyl sodium sulfosuccinate | 1.5 |
| sodium ligninsulfonate | 3 |
| low viscosity methyl cellulose | 1.5 |
| attapulgite | 54 |

Thoroughly blend the ingredients then pass through an air mill to produce an average particle size under 15 microns. Reblend and sift through a U.S.S. No. 50 sieve (0.3 mm opening) before packaging.

All compounds of the invention may be formulated in the same manner.

EXAMPLE 17

| High Strength Concentrate | Percent |
|---|---|
| 3-(4-chlorophenyl)-6-methylthio-s-triazine-2,4(1H,3H)-dione | 98.5 |
| silica aerogel | 0.5 |
| synthetic amorphous fine silica | 1.0 |

Blend and grind the ingredients in a hammer mill to produce a high strength concentrate essentially all passing a U.S.S. No. 50 sieve (0.3 mm openings). This material may then be formulated in a variety of ways.

EXAMPLE 18

| Dust | Percent |
|---|---|
| high strength concentrate, Example 14 | 25.4 |
| pyrophyllite, powdered | 74.6 |

Thoroughly blend the ingredients and package for use.

EXAMPLE 19

| Aqueous Suspension | Percent |
|---|---|
| 3-(2-fluorophenyl)-6-methylthio-s-triazine-2,4(1H,3H)-dione | 25 |
| hydrated attapulgite | 3 |
| crude calcium ligninsulfonate | 10 |
| sodium dihydrogen phosphate | 0.5 |
| water | 61.5 |

Grind the ingredients together in a sand mill until the solid particles have been reduced to diameters under 10 microns.

EXAMPLE 20

| Solution | Percent |
|---|---|
| 3-(4-chlorophenyl)-6-methoxy-s-triazine-2,4(1H,3H)-dione | 12.5 |
| triethanolamine | 7.7 |
| trimethylnonyloxypolyethyleneoxy ethanol | 0.2 |
| water | 79.6 |

Combine the ingredients and stir to produce a solution which can be applied directly at low volume or extended with water.

EXAMPLE 21

| Oil Suspension | Percent |
| --- | --- |
| 3-(4-chloro-2-methylphenyl)-6-methoxy-s-triazine-2,4(1H,3H)-dione | 25 |
| polyoxyethylene sorbitol hexaoleate | 5 |
| highly aliphatic hydrocarbon oil | 70 |

Grind the ingredients together in a sand mill until the solid particles have been reduced to under about 5 microns. The resulting thick suspension may be applied directly, but preferably after being extended with oils or emulsified in water.

Use of the Invention

This invention can be used to facilitate the production of many hybrid crops. For example, in the production of hybrid corn, it can be used to prevent inbreeding. An s-triazinedione of formula I is applied to the corn plant, to be used as the female parent, preferably in a spray or dust formulation, shortly before or at tassel emergence. This treatment substantially prevents pollen shed and may also destroy pollen viability, thus making it unnecessary to detassel. The invention can be used in a similar manner to prevent inbreeding of other crop plants, e.g. wheat, rice, and soybeans, by treating the plants at or near flowering with an s-triazinedione of the formula I.

The invention can also be used to alter fruit set pattern of various crops such as cotton, tomatoes, citrus fruit, peaches, and apples. In these crops it is often desirable to prevent late fruit set or development in order to facilitate mechanical harvesting, and/or eliminate the necessity of thinning. This can be accomplished by applying an s-triazinedione of formula I to the plant after the desired amount of fruit set has taken place.

Similarly, the invention can be used to eliminate fruit set altogether on certain types of ornamentals, e.g. locust, and mimosa trees, where the fruit may be considered undesirable.

The invention can be used to prevent seed development in hay crops such as alfalfa. This is considered desirable because the energy that the plant would otherwise use to develop seeds can be used to increase forage development. Here again, the time to treat the plant is at or near flowering.

Another use for the invention is to prevent asparagus seed development. Asparagus plants are male or female. Female plants are about 20% less productive than male plants, because of the energy utilized in seed development. By spraying the male plants at or just before flowering with a formulation of an s-triazinedione of formula I, fertilization and seed development can be substantialy reduced or prevented, thus increasing yield of the female plants. Prevention of asparagus seed development is also desirable because otherwise the seeds are dropped, geminate, and the seedlings become a weed problem for the mature plants.

Presently in new strawberry plantings, the flowers are pinched off during the first year in order to prevent fruit set. Fruit hinders development of the strawberry plant bed. By use of this invention, i.e. by applying an s-triazinedione to the plants at or near flowering, the need for hand-pinching the flower buds can be eliminated.

Another use of the invention is to prevent fruit set or seed development in certain crops which are not harvested for fruit or seed. For example, by applying one of the s-triazines to potato plants at or near flowering, fruit and seed development which interfere with tuber development, can be prevented.

Still another use for the invention is to control pollen development and/or release in certain noxious weeds, e.g. ragweed.

In this invention the s-triazinediones of formula I are applied to the plant in an amount which is sufficient to produce the desired change in flowering and/or sexual reproduction, but which is insufficient to cause substantial foliar burn, chlorosis, or necrosis. The s-triazinediones vary in degree of phytotoxicity, and the phytotoxicity of a given s-triazinedione varies with the plant species. Thus, it is not possible to state a range of application rates which will be applicable for all s-triazinediones and all plant species. In general, rates in the range of about 0.1 to 10 kg./ha. will be used. The permissible rates for any combination of s-triazinedione and plant species can be readily established empirically.

The capability of 3-(p-chlorophenyl)-6-methoxy-s-triazine-2,4(1H,3H)-dione and related compounds of formula I to affect flowering and sexual reproduction of plants is shown in the following tests:

A. Foliar sprays of 3-(p-chlorophenyl)-6-methoxy-s-triazine-2,4(1H,3H)-dione on Tenderette bush snap beans in the bud stage prevented fruit set 4 weeks with little effect on vegetative growth. Plants were about 23 days old and 25 to 30 cm tall when sprayed. Data from greenhouse tests are summarized below:

Table 1

| | Rate kg/ha. | 3-Week Response Rating[1] | Average Yield Per Plant at 4 Weeks | |
| --- | --- | --- | --- | --- |
| | | | Number of Fruit | Wt. of Fruit (g.) |
| Compound I 3-(p-chlorophenyl)-6-methoxy-s-triazine-2,4(1H,3H)-dione | 1.1 | 2G,DF | 0 | 0 |
| | .27 | 1X,1I,DF | 0 | 0 |
| | .07 | 0 | 2 | 1.8 |
| | 0 | 0 | 16 | 45.9 |
| Compound II 3-(p-chlorophenyl)-6-methylthio-s-triazine-2,4(1H,3H)-dione | 2.2 | 1G,DF | 0 | 0 |
| | .55 | 0, DF | 5 | 5 |

Table 1 — Continued

|  | Rate kg/ha. | 3-Week Response Rating[1] | Average Yield Per Plant at 4 Weeks | |
|---|---|---|---|---|
|  |  |  | Number of Fruit | Wt. of Fruit (g.) |
|  | .14 | 0 | 17 | 36 |
|  | .03 | 0 | 18 | 54 |
|  | 0 | 0 | 17 | 72 |
| Compound III 3-(m-fluorophenyl)-6-methylthio-s-triazine-2,4(1H,3H)-dione | 2.2 | 1B,7G,DF |  |  |
| Compound IV 3-(4-chloro-2-methylphenyl)-6-methylthio-s-triazine-2,4-(1H,3H)-dione | .44 | 4C,7G,DF |  |  |

[1]B = Foliar burn  
G = Growth retarded  
C = Chlorosis-necrosis  
S = Albinism  
0 = no effect, 10 = maximum response A = Growth acceleration  
DF = Fruiting reduced  
I = Increased green color  
X = Axillary stimulation B. Tiny Tim tomatoes with flower buds present were sprayed as above. One plant was treated at each rate and results are indicated below:

Table 2

| Rate kg/ha. | Response Ratings[1] | | Number of Fruit Per Plant | | |
|---|---|---|---|---|---|
|  | 19 Days | 47 Days | 19 Days | 47 Days | 73 Days |
| 1.1 | 3C,2S | 2C,1A | 0 | 0 | 0 |
| .27 | 2C,1S | 1C,2A | 0 | 0 | 1 |
| .07 | 0 | 3A | 0 | 0 | 12 |
| 0 | 0 | 0 | 5 | 21 | 20 |

[1]See footnote in Table 1.

C. Field corn (variety Funk G-4697) was treated at either one week before tassel emergence or at tassel emergence with an overall spray of 3-(p-chlorophenyl)-6-methoxy-s-triazine-2,4(1H,3H)-dione in water containing a wetting agent (0.1% of polyoxyethylene sorbitan monolaurate). Untreated ears of corn were bagged before the silks emerged, then exposed only to tassels of treated plants. (The tassels were manually shaken over the ears.) Appropriate controls were included, as shown in the table below. The ears were allowed to mature, harvested, weighed without drying, and the percent kernel filling estimated.

| Treatment | Time of Treatment[1] | Rate kg/ha | Green Wt. of 5 Ears, kg. | Percent Kernel Filling |
|---|---|---|---|---|
|  | OW | .27 | 6.2 | 55 |
|  | AT | .27 | 7.4 | 68 |
|  | OW | .54 | 6.1 | 56 |
|  | AT | .54 | 5.6 | 40 |
|  | OW | 1.1 | 5.1 | 31 |
|  | AT | 1.1 | 3.5 | 10 |
|  | OW | 2.2 | 3.3 | 7 |
|  | AT | 2.2 | 2.3 | 2 |
| Polyoxyethylene sorbitan monolaurate | OW | — | 6.9 | 68 |
|  | AT | — | 7.0 | 76 |
| Untreated | — | — | 6.9 | 74 |
| Bagged and Not pollenated | — | — | 2.3 | 0 |

[1]OW = One week before tassel emergence.  
AT = At tassel emergence.

We claim:

1. A method for preventing pollen shed in crop plants which comprises applying an s-triazinedione to the plant in an amount which is effective to prevent pollen shed without causing substantial foliar burn, chlorosis, or necrosis, the s-triazinedione being a compound of the formula:

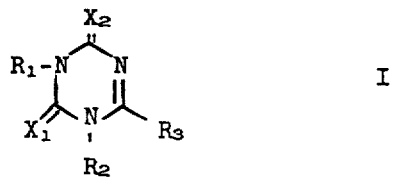

wherein  
$R_1$ is

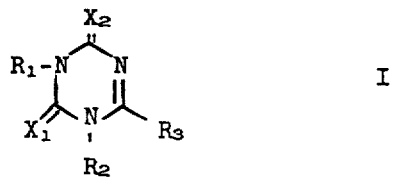

wherein  
Y is hydrogen, halogen, alkyl of 1 through 4 carbon atoms, nitro, alkoxy of 1 through 4 carbon atoms, alkylthio of 1 through 4 carbon atoms, cyano, or trifluoromethyl;  
Z is hydrogen, halogen, methyl, ethyl, nitro, methoxy, or methylthio; and  
Q is hydrogen, halogen, or methyl;  
$R_2$ is hydrogen, or a group

where A is alkyl of 1 through 3 carbon atoms or alkoxy or alkylthio of 1 through 4 carbon atoms, or a cation selected from lithium, sodium, potassium, calcium, magnesium, barium, or

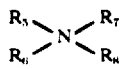

where
$R_5$, $R_6$, and $R_7$ can be the same or different and each can be hydrogen, alkyl of 1 through 4 carbon atoms, or hydroxy alkyl of 2 through 4 carbon atoms; and $R_8$ is hydrogen, alkyl of 1 through 12 carbon atoms, or benzyl; $R_5$ and $R_6$ can be taken together to form a ring that is —(CH$_2$)$_2$—O—(CH$_2$)$_2$— or —(CH$_2$)$_n$— where $n$ is 4–6 and $R_7$ and $R_8$ are H;
$R_3$ is SR$_4$ or OR$_4$ where $R_4$ is methyl or ethyl, and $X_1$ and $X_2$ are oxygen or sulfur.

2. Method of claim 1 wherein Y is hydrogen, halogen or methyl, Z is halogen and Q is hydrogen.

3. Method of claim 2 wherein the s-triazinedione is 3-(4-(chlorophenyl)-6-methylthio-s-triazine-2,4(1H,3H)-dione.

4. Method of claim 2 wherein the s-triazinedione is 3-(4-chlorophenyl)-6-methoxy-s-triazine-2,4(1H,3H)-dione.

5. Method of claim 2 wherein the s-triazinedione is 3-(4-bromophenyl)-6-methoxy-s-triazine-2,4(1H,3H)-dione.

6. Method of claim 2 wherein the s-triazinedione is 3-(3,4-difluorophenyl)-6-methoxy-s-triazine-2,4(1H,3H)-dione.

7. Method of claim 2 wherein the s-triazinedione is 3-(4-methylphenyl)-6-methoxy-s-triazine-2,4(1H,3H)-dione.

8. Method of claim 2 wherein the s-triazinedione is 3-(2-chlorophenyl)-6-methoxy-s-triazine-2,4(1H,3H)-dione.

9. Method of claim 2 wherein the s-triazinedione is 3-(4-fluorophenyl)-6-methoxy-s-triazine-2,4(1H,3H)-dione.

10. Method of claim 2 wherein the s-triazinedione is 3-(2,4-dichlorophenyl)-6-methoxy-s-triazine-2,4(1H,3H)-dione.

11. Method of claim 2 wherein the s-triazinedione is 3-(2-methylphenyl)-6-methoxy-s-triazine-2,4(1H,3H)-dione.

12. Method of claim 1 where the crop is a cereal grain crop.

13. Method of claim 12 where the crop is corn.

14. Method of claim 12 where the crop is rice.

15. Method of claim 12 where the crop is wheat.

16. Method for preventing inbreeding of corn to facilitate the production of hybrid corn seed which comprises applying an s-triazinedione to the corn before or at tassel emergence in an amount sufficient to prevent self-fertilization but insufficient to cause substantial foliar burn, chlorosis, or necrosis, the s-triazinedione being a compound of the formula

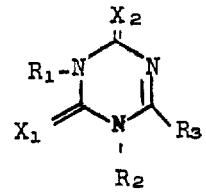

wherein
$R_1$ is

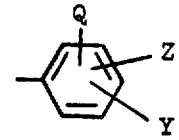

wherein
Y is hydrogen, halogen, alkyl of 1 through 4 carbon atoms, nitro, alkoxy of 1 through 4 carbon atoms, alkylthio of 1 through 4 carbon atoms, cyano, or trifluoromethyl;
Z is hydrogen, halogen, methyl, ethyl, nitro, methoxy, or methylthio; and
Z is hydrogen, halogen, or methyl.
$R_2$ is hydrogen, or a group

where
A is alkyl of 1 through 3 carbon atoms, or alkoxy or alkylthio of 1 through 4 carbon atoms or a cation selected from lithium, sodium, potassium, calcium, magnesium, barium, or

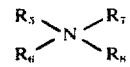

where
$R_5$, $R_6$, and $R_7$ can be the same or different and each can be hydrogen, alkyl of 1 through 4 carbon atoms, or hydroxy alkyl of 2 through 4 carbon atoms; and $R_8$ is hydrogen, alkyl of 1 through 12 carbon atoms, or benzyl; $R_5$ and $R_6$ can be taken together to form a ring that is —(CH$_2$)$_2$—O—(CH$_2$)$_2$— or —(CH$_2$)$_n$— where $n$ is 4–6 and $R_7$ and $R_8$ are H.
$R_3$ is SR$_4$ or OR$_4$ where and $X_1$ and $X_2$ are oxygen or sulfur.

17. Method of claim 16 wherein Y is hydrogen, halogen or methyl, Z is halogen and Q is hydrogen.

18. Method of claim 17 wherein the s-triazinedione is 3-(4-chlorophenyl)-6-methylthio-s-triazine-2,4(1H,3H)-dione.

19. Method of claim 17 wherein the s-triazinedione is 3-(4-chlorophenyl)-6-methoxy-s-triazine-2,4(1H,3H)-dione.

20. Method of claim 17 wherein the s-triazinedione is 3-(4-bromophenyl)-6-methoxy-s-triazine-2,4(1H,3H)-dione.

21. Method of claim 17 wherein the s-triazinedione is 3-(3,4-difluorophenyl)-6-methoxy-s-triazine-2,4(1H,3H)-dione.

22. Method of claim 17 wherein the s-triazinedione is 3-(4-methylphenyl)-6-methoxy-s-triazine-2,4(1H,3H)-dione.

23. Method of claim 17 wherein the s-triazinedione is 3-(2-chlorophenyl)-6-methoxy-s-triazine-2,4(1H,3H)-dione.

24. Method of claim 17 wherein the s-triazinedione is 3-(4-fluorophenyl)-6-methoxy-s-triazine-2,4(1H,3H)-dione.

25. Method of claim 17 wherein the s-triazinedione is 3-(2,4-dichlorophenyl)-6-methoxy-s-triazine-2,4(1H,3H)-dione.

26. Method of claim 17 wherein the s-triazinedione is 3-(2-methylphenyl)-6-methoxy-s-triazine-2,4(1H,3H)-dione.

27. Method of preventing inbreeding of crop plants to facilitate the production of hybrid seed which comprises applying an s-triazinedione to the crop plant before anthesis in an amount sufficient to prevent self-fertilization but insufficient to cause substantial foliar burn, chlorosis, or necrosis, the s-triazinedione being a compound of the formula:

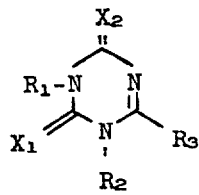

wherein
R₁ is

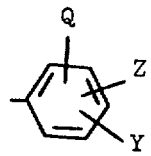

wherein
Y is hydrogen, halogen, alkyl of 1 through 4 carbon atoms, nitro, alkoxy of 1 through 4 carbon atoms, alkylthio of 1 through 4 carbon atoms, cyano, or trifluoromethyl;

Z is hydrogen, halogen, methy, ethyl, nitro, methoxy, or methylthio; and

Q is hydrogen, halogen, or methyl;

R₂ is hydrogen, or a group

where A is alkyl of 1 through 3 carbon atoms or alkoxy or alkylthio of 1 through 4 carbon atoms, or a cation selected from lithium, sodium, potassium, calcium, magnesium, barium, or

where
R₅, R₆, and R₇ can be the same or different and each can be hydrogen, alkyl of 1 through 4 carbon atoms, or hydroxy alkyl of 2 through 4 carbon atoms; and R₈ is hydrogen, alkyl of 1 through 12 carbon atoms, or benzyl; R₅ and R₆ can be taken together to form a ring that is —(CH₂)₂—O—(CH₂)₂— or —(CH₂)ₙ— where n is 4–6 and R₇ and R₈ are H;

R₃ is SR₄ or OR₄ where and

X₁ and X₂ are oxygen or sulfur.

28. Method of claim 27 where the crop is a cereal grain crop.

29. Method of claim 28 where the crop is corn.

30. Method of claim 28 where the crop is rice.

31. Method of claim 28 where the crop is wheat.

* * * * *

UNITED STATES PATENT OFFICE
CERTIFICATE OF CORRECTION

PATENT NO. : 3,898,073
DATED : August 5, 1975
INVENTOR(S) : David J. Fitzgerald and James D. Long It is certified that error appears in the above-identified patent and that said Letters Patent are hereby corrected as shown below:

In claim 16, column 22, line 28 should read:

-- Q is hydrogen, halogen or methyl; -- and column 22, line 55 should read:

-- $R_3$ is $SR_4$ or $OR_4$ where $R_4$ is methyl or ethyl, and -- .

In claim 27, column 24, line 6, "methy" should be

-- methyl -- and column 24, line 35 should read:

-- $R_3$ is $SR_4$ or $OR_4$ where $R_4$ is methyl or ethyl, and -- .

Signed and Sealed this thirteenth Day of April 1976

[SEAL]

Attest:

RUTH C. MASON
*Attesting Officer*

C. MARSHALL DANN
*Commissioner of Patents and Trademarks*